United States Patent [19]
Yokouchi et al.

[11] Patent Number: 5,023,896
[45] Date of Patent: Jun. 11, 1991

[54] X-RAY TELEVISION APPARATUS

[75] Inventors: Hisatake Yokouchi, Nishitama; Yukio Takasaki, Mobara; Tadaaki Hirai, Koganei; Kouichi Koike; Masayuki Tsuneoka, both of Kashiwa; Yoichi Onodera, Hachiouji; Takakazu Funo, Nishitama, all of Japan

[73] Assignee: Hitachi-Medical Corporation, Tokyo, Japan

[21] Appl. No.: 356,419

[22] Filed: May 25, 1989

[30] Foreign Application Priority Data

May 27, 1988 [JP] Japan .................. 63-129961

[51] Int. Cl.⁵ .............................. H05G 1/58
[52] U.S. Cl. ........................ 378/99; 378/116
[58] Field of Search .......... 378/99, 114–116, 378/190–192

[56] References Cited

U.S. PATENT DOCUMENTS

| | | | |
|---|---|---|---|
| 3,271,608 | 9/1966 | Rome et al. | 378/99 |
| 3,466,388 | 9/1969 | McMaster et al. | 378/99 |
| 3,668,396 | 6/1972 | Asars et al. | 378/99 |
| 4,161,755 | 7/1979 | Haendle et al. | 378/99 |
| 4,658,413 | 4/1987 | Nishioka et al. | 378/114 |
| 4,669,105 | 5/1987 | Fenster et al. | 378/99 |
| 4,736,397 | 4/1988 | Velasquez | 378/114 |
| 4,852,139 | 7/1989 | Sandrik et al. | 378/99 |
| 4,860,093 | 8/1989 | Yamashita et al. | 358/50 |
| 4,888,521 | 12/1989 | Taniaka et al. | 313/366 |

FOREIGN PATENT DOCUMENTS 0163343 9/1983 Japan .
0287597 12/1987 Japan .

OTHER PUBLICATIONS

English abstract of Japanese patent 62-287597.

Primary Examiner—Carolyn E. Fields
Assistant Examiner—David P. Porta
Attorney, Agent, or Firm—Antonelli, Terry, Stout & Kraus

[57] ABSTRACT

An X-ray television apparatus applies an X-ray to an object to be inspected, converts the X-ray projection image of the object into an optical image by a fluorescent screen or an X-ray image intensifier, picks up the optical image by a TV camera, displays the video signal obtained by a TV monitor for fluoroscopic monitoring, and records radiograph of the object by using the video signal. Avalanche multiplication is caused on the photoconductive layer of the image pick-up tube of the TV camera so as to enable monitoring or imaging with high sensitivity at a low X-ray dose rate.

16 Claims, 5 Drawing Sheets

X-RAY TELEVISION APPARATUS

BACKGROUND OF THE INVENTION

Field of the Invention

The present invention relates to an X-ray apparatus for diagnosis use and, more particularly, to an X-ray television apparatus for picking up a fluoroscopic image by using one image pick-up tube.

Diagnosis using an X-ray image, which is very effective for early detection of a disease, has frequently been conducted. For example, a fluoroscopic and radiographic apparatus is used for picking up such an X-ray image, and the position and the state of the portion being picked up are observed in a fluoroscopic monitoring mode with a small X-ray dose prior to radiographic imaging, and then the image is radiographically picked up, namely, fixed with increased X-ray dose at the desired position and timing.

Fluoroscopy is largely divided into the following three methods:

(1) simple fluoroscopy for directly observing a fluorescent screen, (2) X-ray II fluoroscopy for directly observing an X-ray image intensifier (hereinunder referred to as "X-ray II") outputting surface, and (3) X-ray TV fluoroscopy for observing an X-ray image picked up by a television camera through a TV monitor. Among these, X-ray TV fluoroscopy is now in frequent use because it enables observation in a daylight room and remote control and, in particular, X-ray II — TV camera systems which can produce a light image at a small X-ray dose is most frequently used.

Such apparatuses for carrying out fluoroscopy through a TV camera, namely, X-ray television apparatuses are described in, for example, Japanese Patent Application Laid-Open Nos. 58-163343 (1983) and 62-287597 (1987). These apparatuses are further provided with an A/D converter for converting a video signal into a digital signal and a memory for storing the thus-obtained digital signal, thereby enabling digital radiography.

The above-described X-ray television apparatuses using an X-ray II and a TV camera have the following problems together with the above-described advantages:

(1) Since an X-ray II is used, the visual field is narrow and it is difficult to enlarge the visual field.

(2) Since an X-ray II is very expensive, the apparatus also is expensive.

As inexpensive X-ray — TV fluoroscopy, a system of picking up the fluorescence emitted from a fluorescent screen may be considered. However, since the luminance of the fluorescent screen is lower by about two figures than an X-ray II, a system sufficed with an X-ray dose as small as an X-ray II has not been realized.

SUMMARY OF THE INVENTION

Accordingly, it is an object of the present invention to eliminate the above-described problems in the prior art and to provide an X-ray television apparatus which is capable of producing a sufficient image at a smaller X-ray dose.

It is another object of the present invention to provide an X-ray television apparatus having a large visual field at a low apparatus cost.

It is still another object of the present invention to provide an X-ray television apparatus which is capable of selecting an appropriate operation of the TV camera at the time of both fluoroscopic monitoring and radiographic imaging.

To achieve this aim, in one aspect of the present invention, there is provided an X-ray television apparatus comprising: an X-ray generating means for applying it to an object being inspected; an X-ray sensor for converting the X-ray projection of the object into an optical image and forming the real image thereof; a TV camera for converting the real image into a video signal; and a TV monitor for displaying the video signal; the TV camera including an image pick-up tube having an amorphous semiconductor as a photoconductive layer on which avalanche multiplication is caused for the purpose of conversion of the video signal, and the X-ray sensor being composed of a fluorescent screen for converting the X-ray projection into an optical image and an optical lens for forming the optical image on the image input surface of the TV camera.

In another aspect of the present invention, there is provided an X-ray television apparatus comprising, in addition to the above-described elements, a means for switching between the modes for causing and not causing avalanche multiplication on the photoconductive layer. In the fluoroscopic monitoring mode in which a low X-ray dose rate is adopted and the video signal from the TV camera is displayed at real time, avalanche multiplication is caused, and in the radiographic imaging mode in which a higher X-ray dose rate is adopted and a radiograph of the object is recorded by using the video signal from the TV camera, ordinary operation is carried out without causing avalanche multiplication.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
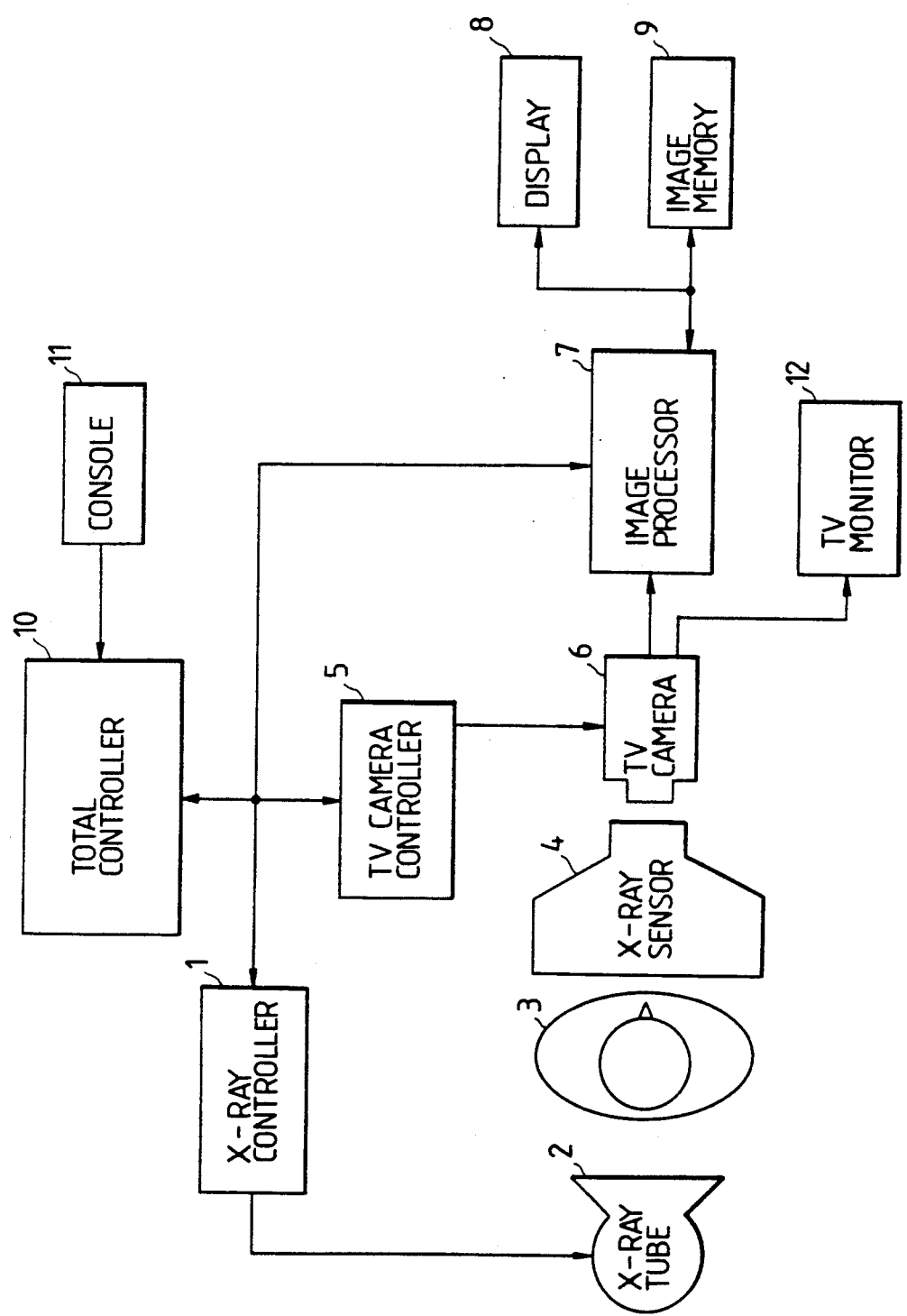
FIG. 1 is a block diagram of an embodiment of the present invention.

FIG. 1 is a block diagram of an embodiment of an X-ray television apparatus according to the present invention. In FIG. 1, the reference numeral 1 represents an X-ray controller for controlling the generation of X-rays, 2 an X-ray tube for generating an X-ray and applying it to an object being inspected 3, 4 an X-ray sensor for converting the X-ray projection of the object 3 into an optical image, and 5 a TV camera controller for controlling a TV camera 6. An image processor 7 processes the video signal which is output from the TV camera 6, and controls the display and storage of the video signal. The reference numeral 8 denotes a display for displaying the image output of the image processor 7, and 9 an image memory for storing the output of the image processor 7. A total controller 10 synthetically controls the X-ray controller 1, the TV camera controller 5 and the image processor 7, a console 11 receives various operation inputs from the operator and transmits them to the total controller 10, and a TV monitor 12 displays the video signal output from the TV camera 6. The X-ray television apparatus have two operation modes, namely, a fluoroscopic mode in which the fluoroscopic image converted into a video signal by the TV camera 6 is displayed in real time, and a radiographic imaging mode in which the processed video signal is stored in the image memory 9 to record a radiograph of the object.

Figure 2:
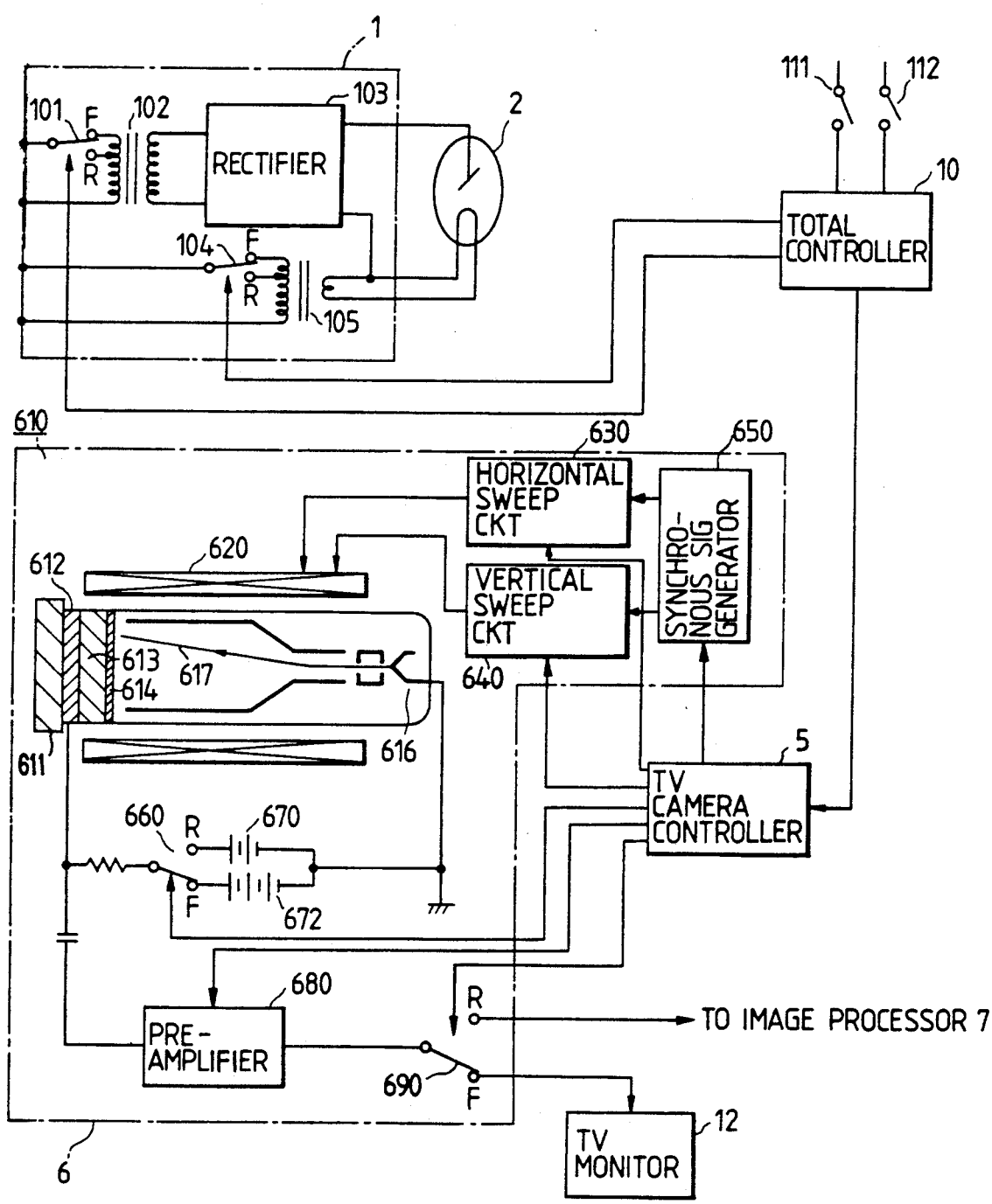
FIG. 2 is a block diagram showing the main part of the embodiment shown in FIG. 1.

FIG. 2 shows the details of the main part of the embodiment shown in FIG. 1. This embodiment will be explained hereinunder with reference to FIGS. 1 and 2.

The X-ray controller 1 includes a transformer 102 for an anode voltage, a rectifier 103 for rectifying the secondary output of the transformer 102 and supplying the rectified output to the anode of the X-ray tube, and a transformer 105 for a heater. Both transformers 102 and 105 have a plurality of taps on the primary sides thereof, the taps being switchable by switches 101 and 104, respectively. The console 11 is provided with a switch 111 for inputting the initiation of the fluoroscopic mode and a switch 112 for inputting the initiation of the radiographic imaging mode. When the initiation of the fluoroscopic mode is instructed, the total controller 10 commands the X-ray controller 1 to generate an X-ray at a low dose rate. The X-ray controller 1 closes the contacts of the switches 101 and 104 on the respective F sides in accordance with the command signal transmitted from the total controller 10, and supplies AC power from the taps on the respective F sides to the transformers 102 and 105. Consequently, a low anode voltage and a small heater current is supplied to the X-ray tube 2, and the X-ray tube 2 generates an X-ray for fluoroscopic monitoring at a low dose rate. Thereafter, when the initiation of the radiographic imaging mode is instructed, the contacts of the switches 101 and 104 are closed on the respective R sides in accordance with the command signal from the total controller 10. As a result, a high anode voltage and a large heater current is supplied to the X-ray tube 2, and the X-ray tube 2 generates an X-ray for radiographic imaging at a high dose rate. Additionally, the X-ray dose rates can also be switched by varying the internal resistance of the rectifier 103.

The fluoroscopic image of the object 3 exposed to the X-ray is converted into an optical image by the X-ray sensor 4 which will be described later in detail, and input to the TV camera 6. In this embodiment, the image pick-up tube (represented by the reference numeral 610 in FIG. 2) used for the TV camera 6 has a blocking type target. More specifically, a signal electrode 612 on a substrate 611 and a photoconductive layer 613 consisting of an amorphous semiconductor constitutes blocking type contacts, and an electron injection blocking layer 614 is provided on the photoconductive layer 613. This structure prevents the charge injection into the photoconductive layer 613 due to the electric field. It is sometimes necessary to provide a hole injection blocking layer between the signal electrode 612 and the photoconductive layer 613 depending upon the materials thereof. In addition, in this embodiment, avalanche multiplication is caused on the photoconductive layer 613 of the image pick-up tube 610 so as to greatly enhance the light receiving sensitivity. In the avalanche multiplication region, however, noise is increased with the increase in the signal output and the S/N ratio is generally deteriorated. Therefore, the image pick-up tube 610 is operated in the avalanche multiplication region only in the fluoroscopic monitoring mode in which the television camera is required to have a high sensitivity due to a small X-ray dose, and ordinary operation region is used in which avalanche multiplication is not caused on the photoconductive layer 613 in the radiographic imaging mode in which a high S/N ratio is required for imaging rather than a high sensitivity. For this purpose, two voltage sources 670 and 672 for supplying a target voltage $V_T$ which is applied to the signal electrode of the image pick-up tube 610 are prepared, and the image pick-up tube 610 is connected to the high-voltage source 672 by closing the switch 660 on the F side in the fluoroscopic monitoring mode, while in the radiographic imaging mode, the image pick-up tube 610 is connected to the low-voltage source 670 by closing the switch 660 on the R side. In the fluoroscopic monitoring mode, a switch 690 is closed on the F side, and the video signal through a preamplifier 680 is directly transmitted to the TV monitor 12. In the radiographic image mode, the switch 690 is closed on the R side, and the video signal is transmitted to the image processor 7 and is stored in the image memory 9 after the necessary processing such as A/D conversion and logarithm conversion. Furthermore, in this embodiment, in the fluoroscopic monitoring mode, scanning by the television camera 6 is carried out in a first scanning mode in which 30 frames per second and about 500 or 1000 scanning lines are used. On the other hand, in the radiographic imaging mode, scanning by the television camera 6 is carried out in a second scanning mode in which 3.75 frames per second and about 2000 scanning lines are used. Consequently, the respective operations of a horizontal sweep circuit 630 and a vertical sweep circuit 640 for providing horizontal and vertical deflection signals, respectively, for a deflection coil 620 of the image pick-up tube 610, and a synchronization generator 650 for supplying a synchronization signal to the sweep circuits 630 and 640 are switched between the fluoroscopic monitoring mode and the radiographic imaging mode. The gain of the preamplifier 680 is also switched to a gain suitable for the corresponding operation mode. The respective control signals for the changeover between the switches 660 and 690, the operations of the horizontal sweep circuit 630, the vertical sweep circuit 640 and the synchronization signal generator 650, and the gains of the preamplifier 680 are supplied from the TV camera controller 5 which has received a mode instruction from the total controller 10.

Figure 3:
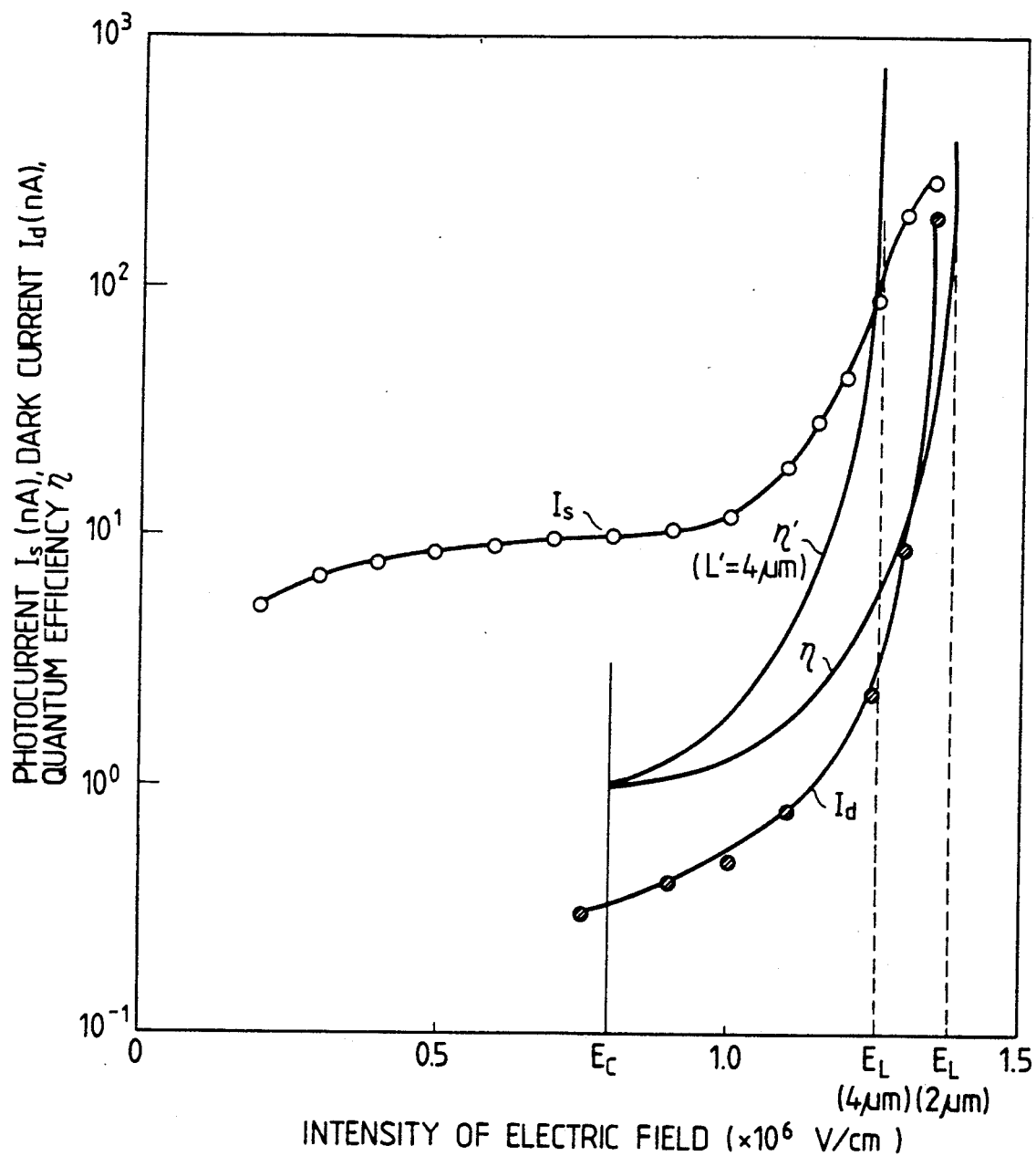
FIG. 3 is a graph showing the current - electric field characteristic of a photoconductive layer.

FIG. 3 show the current - electric field characteristic and the quantum efficiency of the typical example of a photoconductive layer consisting of an amorphous semiconductor containing selenium as the main ingredient. The symbol Is represents a photocurrent (nA) with respect to blue light having a wavelength of 450 nm, Id a dark current (nA) and $\eta$ represents a quantum efficiency. The abscissa represents the field intensity E ($\times 10^6$ V/cm) of the photoconductive layer. These data were obtained from a photoconductive layer having a thickness of 2 $\mu$m. The symbol $\eta'$ represents a quantum efficiency obtained from a photoconductive layer of the same material and having a thickness of 4 $\mu$m. In both of the photoconductive layers, the quantum efficiency $\eta$ exceeds 1 and avalanche multiplication effect is obviously produced on the photoconductive layer in the region in which the field intensity E is not less than Ec (about $0.8 \times 10^6$ V/cm). The higher the field intensity E is, the more $\eta$ increases, but if E is too strong, the dark current so rapidly increases that it is difficult to use the photoconductive layer as a photosensor. If it is assumed that the threshold field intensity is $E_L$, $E_L$ reduces with the increase in the thickness of the photoconductive layer. For example, if the film thickness is 2 $\mu$m, $E_L$ is $1.38 \times 10^6$ volt/cm, and if the film thickness is 4 $\mu$m, $E_L$ is $1.26 \times 10^6$ volt/cm. Therefore, if a semiconductor photoconductive layer having a thickness of 2 $\mu$m is used as the image pick-up tube in this embodiment at a field intensity of 0.8 to 1.3 volt/cm in consideration of a slight margin, avalanche multiplication operation is realized. The field intensity is 160 to 260 volts calculated in terms of target voltage $V_T$. When a photoconductive layer having a thickness of 4 $\mu$m is used, the intensity of electric field is about 320 to 500 volts. On the other hand, in the radiographic imaging mode, the operation with a high S/N ratio is carried out at a field intensity of not more than Ec. For example, if a conductive layer having a thickness of 2 $\mu$m is used, $V_T$ is about 100 volts, and in the case of a thickness of 4 $\mu$m, $V_T$ is about 200 volts.

Figure 4:
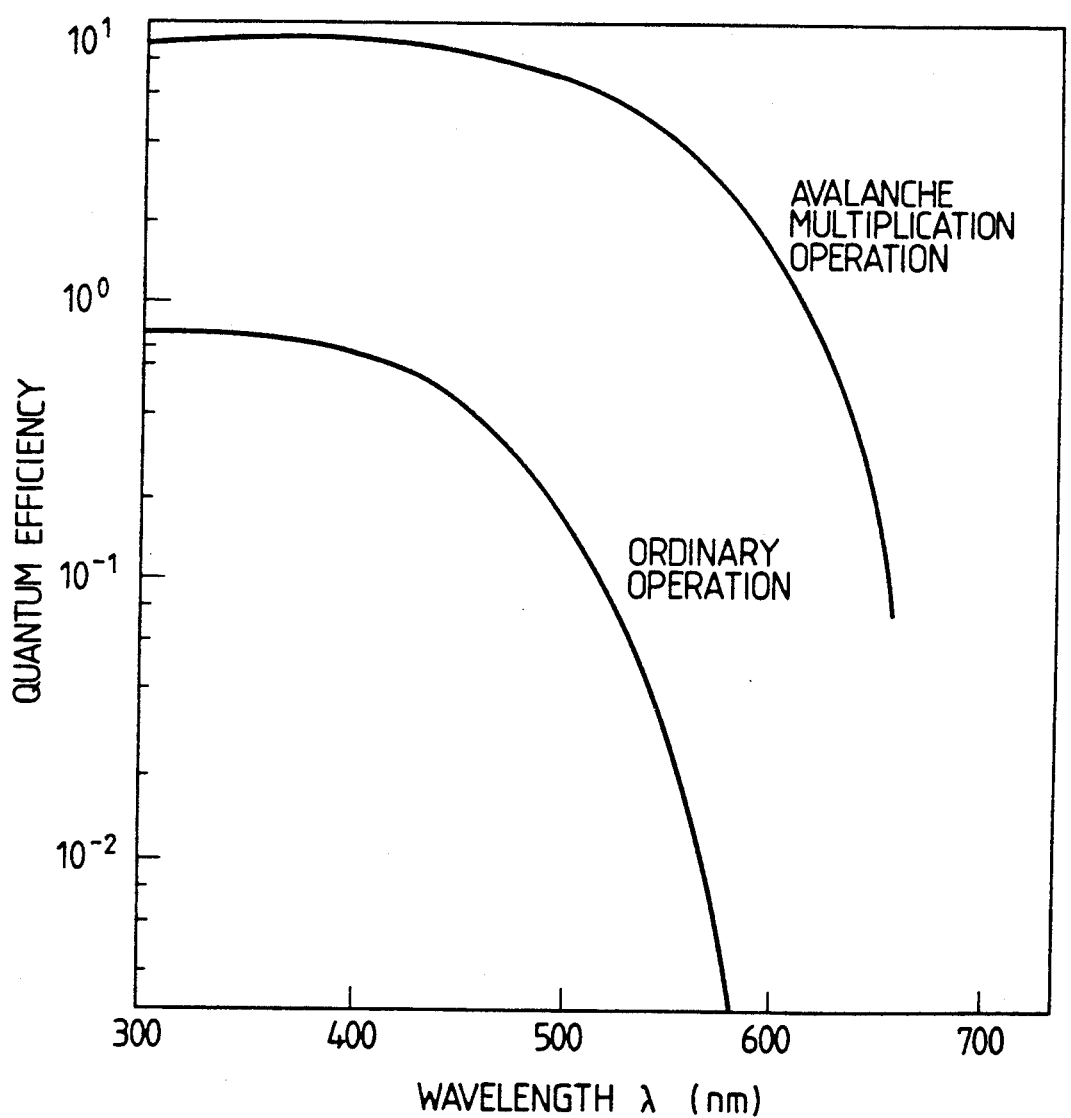
FIG. 4 is a characteristic curve of the spectral sensitivity of an image pick-up tube.

FIG. 4 shows the spectral sensitivity characteristic of the image pick-up tube using the above-described photoconductive layer material. The abscissa represents the wavelength $\lambda$ (nm) of input light and the ordinate a quantum efficiency. As shown in FIG. 4, the quantum efficiency greatly reduces with respect to the wavelength of more than about 500 nm both in avalanche multiplication operation and in ordinary operation. Accordingly, an X-ray sensor in which the light emission wavelength has its peak at not more than 500 nm is used as the X-ray sensor 4 shown in FIG. 1. As such an X-ray sensor, for example, a scintillator using fluorescent substances such as those shown in Table 1 is effective.

TABLE 1

| Fluorescent Substance | Emission Color | Spectrum Dominant Wavelength (nm) |
|---|---|---|
| ZnS:Ag | Blue | 450 |
| CsI:Na | Blue | 420 |
| CaWO$_4$ | Blue | 420 |
| BaSO$_4$:Eu$^{2+}$ | Violet | 375 |
| LaOBr:Tm | Blue | 460 |
| BaFCl:Eu$^{2+}$ | Violet | 380 |
| BaFBr:Eu$^{2+}$ | Violet | 390 |
| CaO:Pb | Blue | 370 |
| NaI:Tl | Blue | 410 |
| Y$_2$SI$_2$O$_7$:Ce$^{3+}$ | Violet | 370 |
| Y$_4$SI$_2$O$_8$Cl:Ce$^{3+}$ | Violet | 370 |
| HfP$_2$O$_7$ | Ultra Violet | 260 to 300 |

FIGS. 5 to 8 show embodiments having different X-ray sensors 4. These embodiments will be explained in serial order.

Figure 5:
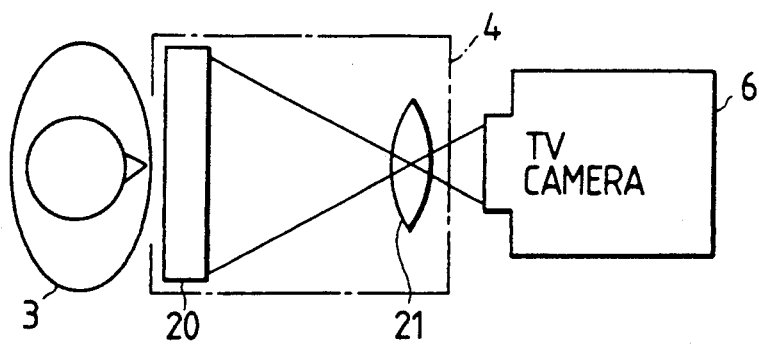
FIGS. 5 to 8 respectively show the concepts of the examples of an X-ray sensor.

FIG. 5 shows an embodiment having the X-ray sensor 4 composed of a fluorescent screen 20 using a fluorescent substance in which the peak value of the emission wavelength is not more than 500 nm, as described above, and a convergent lens system 21. If the X-ray dose rate is the same, the luminance of the output image of the fluorescent screen is lower than the luminance of the output image obtained by an X-ray II. However, by operating the image pick-up tube in the avalanche multiplication region in the fluoroscopic monitoring mode, as described above, it is possible to enhance the sensitivity of the TV camera and to monitor the real time X-ray projection image at a low X-ray dose rate as in the case of using an X-ray II. In addition, since the fluorescent screen is less expensive and have a simpler structure than an X-ray II, it is possible to realize an X-ray television apparatus having a large field view at a low apparatus cost. If the luminance of the fluorescent screen 20 is insufficient in the radiographic imaging mode, the image pick-up tube may be operated in the avalanche multiplication region even in the radiographic imaging mode. However, in order to reduce the deterioration of the S/N ratio, the image pick-up tube is preferably used at a field intensity closer to Ec than in the fluoroscopic monitoring mode, in other words, at a target voltage $V_T$ lower than in the fluoroscopic monitoring mode.

Figure 6:
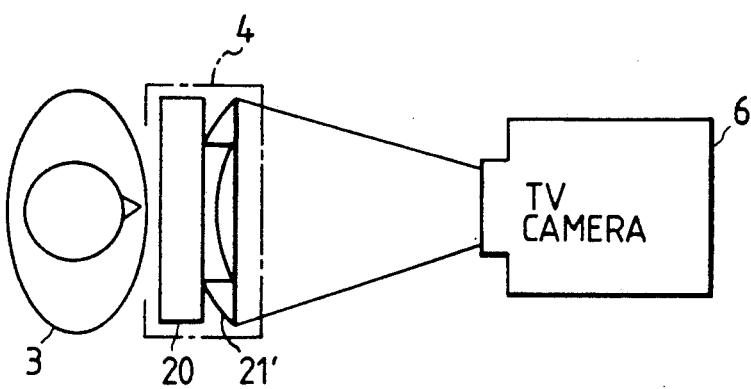

FIG. 6 shows an embodiment having the X-ray sensor 4 integrally composed of the fluorescent screen 20 and a convergent lens 21'. The fundamental structure is the same as that of the embodiment shown in FIG. 5.

Figure 7:
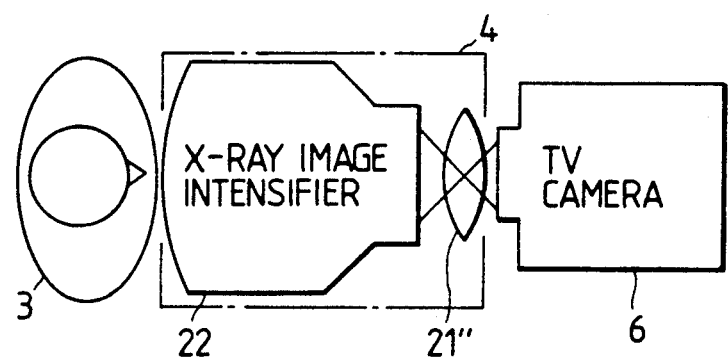

FIG. 7 shows an embodiment having the X-ray sensor 4 composed of an X-ray II 22 and a convergent lens 21''. According to this embodiment, it is possible to greatly reduce the X-ray dose rate in the fluoroscopic monitoring mode and to greatly improve the safety of the apparatus.

Figure 8:
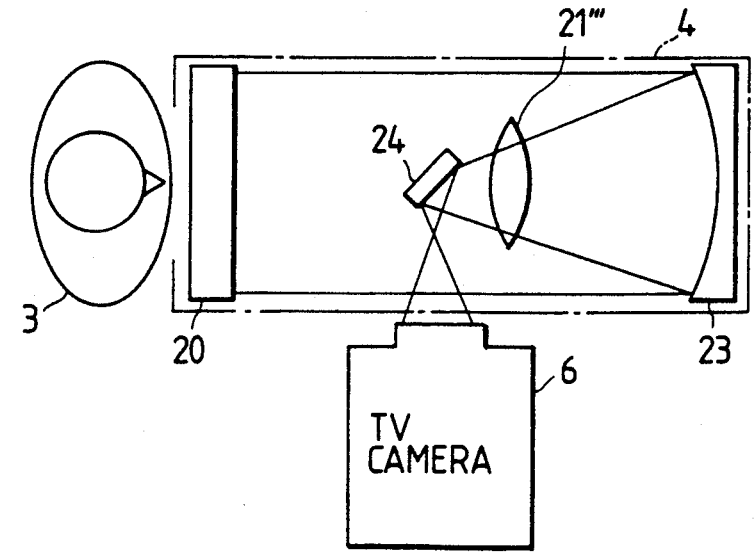

FIG. 8 shows an embodiment having the X-ray sensor 4 composed of the fluorescent screen 20, a concave reflecting mirror 23 and the convergent lens system 21'''. According to this embodiment, it is possible to enhance the utilization of the quantity of light of an image in comparison with the embodiments having the X-ray sensor 4 composed of the fluorescent screen and the convergent lens.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An X-ray television apparatus comprising:
    X-ray generating means for applying X-rays to an object to be inspected;
    an X-ray sensor for converting an X-ray projection image of said object into an optical image and forming a real image thereof;
    a TV camera including an image pick-up tube having a photoconductive layer with a structure enabling blocking of charge injection into said photoconductive layer due to an electric field, and enabling operations of avalanche multiplication and non-avalanche multiplication in said photoconductive layer, said TV camera receiving said real image and converting said real image into a video signal for each of the avalanche multiplication and non-avalanche multiplication operations in said photoconductive layer in said image pick-up tube;
    a TV monitor for displaying the video signal delivered out of said TV camera in real time;
    recording means for recording a radiograph of said object by using the video signal delivered out of said TV camera; and
    control means for enabling switching of the operations of said photoconductive layer between the operation enabling said avalanche multiplication and the operation enabling said non-avalanche multiplication;
    wherein said control means enables said avalanche multiplication operation in said photoconductive layer in a first operation mode in which said video signal is displayed by said TV monitor in real time, and enables said non-avalanche multiplication in said photoconductive layer in a second mode in which said radiograph is recorded by said recording means.

2. An X-ray television apparatus according to claim 1, wherein said photoconductive layer is composed of an amorphous semiconductor containing Se as the main ingredient.

3. An X-ray television apparatus according to claim 1, wherein said X-ray sensor has an emission spectrum in which the peak of emission wavelength is not more than 500 nm.

4. An X-ray television camera according to claim 1, wherein said X-ray sensor includes a fluorescent screen for converting said X-ray projection image of said object into said optical image and an optical lens for forming said optical image on an image input surface of said TV camera.

5. An X-ray television apparatus according to claim 1, wherein said X-ray sensor includes an X-ray image intensifier for intensifying said X-ray projection image of said object and converting said image into said optical image and an optical lens for forming said optical image on an image input surface of said TV screen.

6. An X-ray television apparatus comprising:
X-ray generating means for applying X-rays to an object to be inspected;
an X-ray sensor for converting an X-ray projection image of said object into an optical image and forming a real image thereof;
a TV camera including an image pick-up tube having a photoconductive layer with a structure enabling blocking of charge injection into said photoconductive layer due to an electric field, and enabling operations of avalanche multiplication and non-avalanche multiplication in said photoconductive layer, said TV camera receiving said real image and converting said real image into a video signal for each of the avalanche multiplication and non-avalanche multiplication operations in said photoconductive layer in said image pick-up tube;
a TV monitor for displaying the video signal delivered out of said TV camera in real time;
a recording means for recording a radiograph of said object by using the video signal delivered out of said TV camera; and
control means for enabling switching of the operations of said photoconductive layer between the operation enabling said avalanche multiplication and the operation enabling said non-avalanche multiplication.

7. An X-ray television apparatus according to claim 6, wherein said control means switches the operation of said photoconductive layer into the operation enabling said avalanche multiplication in said photoconductive layer in at least an operation mode in which said video signal is displayed by said TV monitor in real time.

8. An X-ray television apparatus according to claim 7, wherein said photoconductive layer is composed of an amorphous semiconductor containing Se as the main ingredient.

9. An X-ray television apparatus according to claim 7, wherein said X-ray sensor has an emission spectrum in which the peak of emission wavelength is not more than 500 nm.

10. An X-ray television camera according to claim 7, wherein said X-ray sensor includes a fluorescent screen for converting said X-ray projection image of said object into said optical image and an optical lens for forming said optical image on an image input surface of said TV camera.

11. An X-ray television apparatus according to claim 7, wherein said X-ray sensor includes an X-ray image intensifier for intensifying said X-ray projection image of said object and converting said image into said optical image and an optical lens for forming said optical image on an image input surface of said TV screen.

12. An X-ray television apparatus according to claim 6, wherein said control means switches the operation of said photoconductive layer into the operation enabling said avalanche multiplication in said photoconductive layer in a first operation mode in which said video signal is displayed by said TV monitor in real time, and said control means switches the operation of said photoconductive layer into the operation enabling one of said avalanche multiplication and said non-avalanche multiplication in said photoconductive layer in a second mode in which said radiograph is recorded by said recording means.

13. An X-ray television apparatus according to claim 12, wherein said photoconductive layer is composed of an amorphous semiconductor containing Se as the main ingredient.

14. An X-ray television apparatus according to claim 12, wherein said X-ray sensor has an emission spectrum in which the peak of emission wavelength is not more than 500 nm.

15. An X-ray television camera according to claim 12, wherein said X-ray sensor includes a fluorescent screen for converting said X-ray projection image of said object into said optical image and an optical lens for forming said optical image on an image input surface of said TV camera.

16. An X-ray television apparatus according to claim 12, wherein said X-ray sensor includes an X-ray image intensifier for intensifying said X-ray projection image of said object and converting said image into said optical image and an optical lens for forming said optical image on an image input surface of said TV screen.

* * * * *